United States Patent [19]

Lingl

[11] 4,203,937

[45] May 20, 1980

[54] PROCESS AND APPARATUS FOR THE MANUFACTURE OF PREFABRICATED LINED WALL SECTIONS

[75] Inventor: Hans Lingl, Neu-Ulm-Ludwigsfeld, Fed. Rep. of Germany

[73] Assignee: Lingl Corporation, Paris, Tenn.

[21] Appl. No.: 762,921

[22] Filed: Jan. 26, 1977

Related U.S. Application Data

[63] Continuation of Ser. No. 552,261, Feb. 24, 1975, abandoned.

[30] Foreign Application Priority Data

Feb. 22, 1974 [DE] Fed. Rep. of Germany ....... 2408484
Jan. 30, 1975 [DE] Fed. Rep. of Germany ....... 2503685

[51] Int. Cl.$^2$ .......... B32B 3/10
[52] U.S. Cl. .......... 264/101; 264/253; 264/261; 294/65
[58] Field of Search .......... 264/253, 261, 101; 294/65, 64 R; 52/315

[56] References Cited

U.S. PATENT DOCUMENTS

| | | | |
|---|---|---|---|
| 3,610,673 | 10/1971 | Stronbeck | 294/65 |
| 3,660,214 | 5/1972 | Nichols | 52/315 X |
| 3,860,280 | 1/1975 | Karlsson | 294/65 X |
| 3,868,801 | 3/1975 | Weiner | 264/261 X |

*Primary Examiner*—Thomas P. Pavelko
*Attorney, Agent, or Firm*—Cushman, Darby & Cushman

[57] ABSTRACT

A method and apparatus for automatically constructing prefabricated wall sections of brick wall panels with a tile lining. A prefabricated brick wall panel has columns of mortar disposed in parallel strips thereon, a lining panel of unconnected tile members is assembled, proper spacing being introduced between each of the tile members, and the tile members are transferred in groups or en masse to a position over the wall panel. The lining panel members are then firmly pressed into engagement with the wall panel with mortar columns therealong, thereby forming a completed wall section. Preferred apparatus includes vacuum grippers, scissor-connected link spacing means, and flatbed cars movable on tracks to a position below automatic mortar applying means.

10 Claims, 9 Drawing Figures

Fig. 2
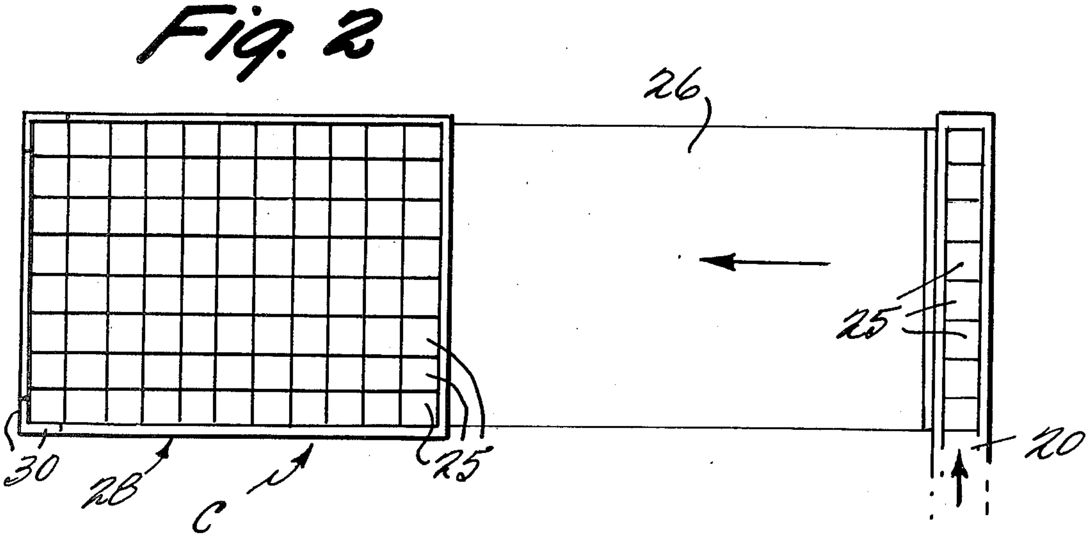
Fig. 3a
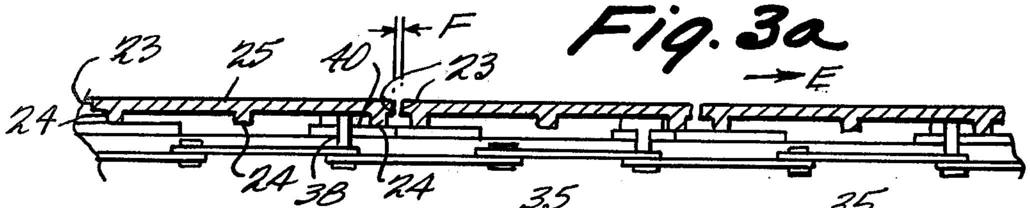
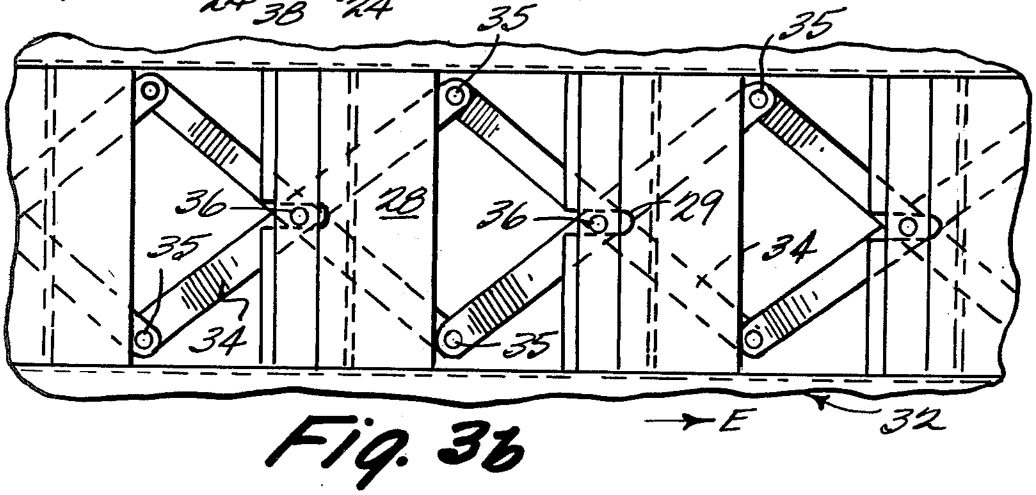
Fig. 3b
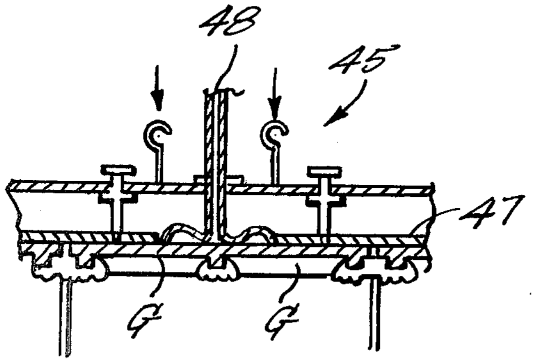
Fig. 4b
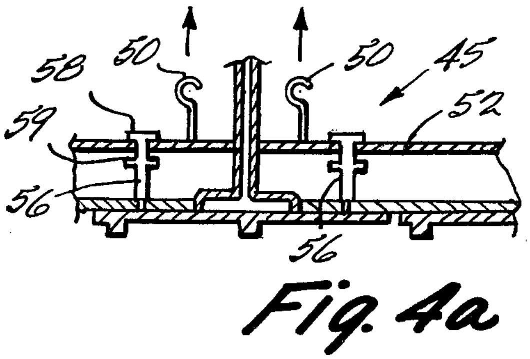
Fig. 4a Fig. 5
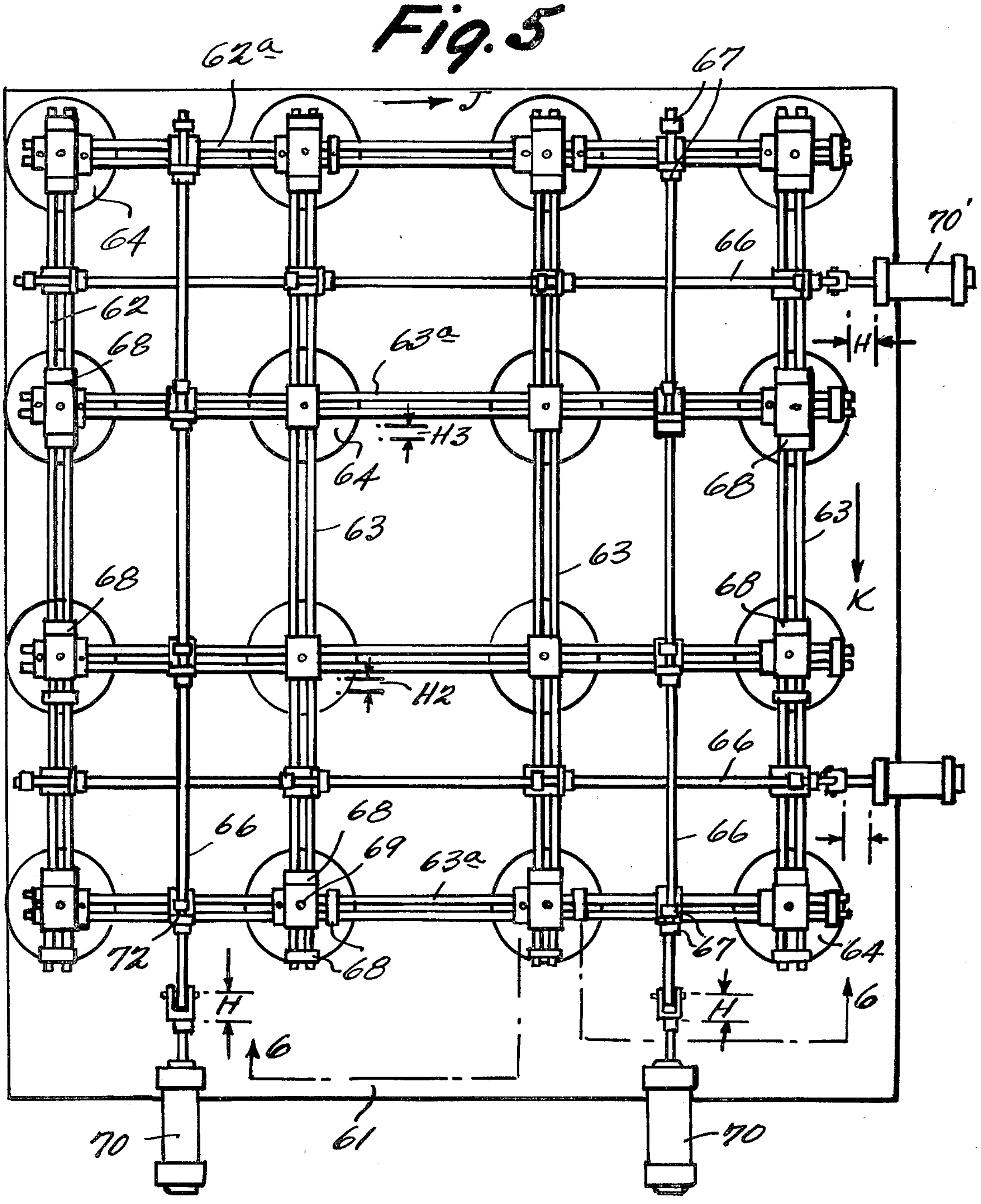
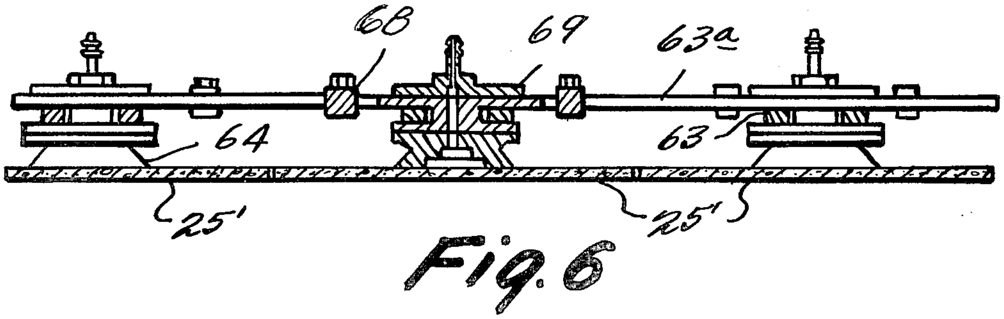
Fig. 6

PROCESS AND APPARATUS FOR THE MANUFACTURE OF PREFABRICATED LINED WALL SECTIONS

CROSS-REFERENCE TO RELATED APPLICATIONS

This application is a continuation of Ser. No. 552,261 filed Feb. 24, 1975, now abandoned.

BACKGROUND AND SUMMARY OF THE INVENTION

It has been demonstrated that for many types of buildings it is desirable to have wall sections formed of a brick exterior with a lining of tiles affixed to the bricks. Such wall sections have been shown in German Offenlegungsschrift No. 2,102,664. It has also been shown that in many instances it is desirable to make preformed wall sections. When constructing wall sections of bricks with a tile lining by hand, however, the procedure is very time consuming and complicated whether for preformed wall sections or those constructed in the field, and sometimes not economically practical.

According to the present invention, preformed wall sections having exteriors of brick, block, or the like with a lining of tile or the like are economically constructed automatically with a minimum of labor and wasted effort, yet the wall sections constructed thereby are of high quality and will remain intact even over extended periods of use. According to a preferred method of the present invention a preformed brick wall panel is disposed in a generally horizontal plane, a lining panel composed of individual tile members is assembled, proper spacings are introduced between the tiles, columns of mortar are disposed along the upper face of the horizontally disposed wall panel, and the lining panel members are transferred in groups or en masse to a position over the wall panel, and are then firmly pressed into engagement with the mortar columns. The mortar columns are preferably arranged so that when a wall section containing the same is in use, the columns will run vertically.

Exemplary apparatus according to the present invention may include vacuum grippers for transferring of the lining panel to position over the wall panel, flatbed cars movable on tracks for locating the wall panels in proper position, automatic means for applying all mortar columns simultaneously onto a wall panel upper face, and spacing means for introducing a predetermined space between various tiles of lining panel including a plurality of sets of plural levers interconnected to form a scissors-like device. Also, the vacuum grippers can be so constructed that they introduce the predetermined spacing between the tiles after lifting thereof from a horizontal surface.

It is an object of the present invention to provide an improved method—and improved apparatus for accomplishing the method—for constructing preformed wall sections. This and other objects of the invention will become clear from an inspection of the detailed description of the invention and from the appended claims.

BRIEF DESCRIPTION OF THE DRAWINGS

FIG. 2 is a top plan view of an exemplary lining panel being formed according to the present invention for disposition on a wall panel, utilizing exemplary apparatus according to the present invention;

FIG. 3*a* is a side view of a portion of an exemplary lining panel and supporting apparatus therefor;

FIG. 3*b* is a detail top plan view with the lining panel removed of the exemplary apparatus shown in FIG. 3*a;*

FIG. 4*a* is a cross-sectional view of exemplary vacuum gripping apparatus in operative relationship with portions of a lining panel for movement thereof according to the present invention;

FIG. 4*b* is a cross-sectional view of the apparatus shown in FIG. 4*a* in operative relationship with portions of a lining panel for pressing thereof into engagement with a wall panel;

FIG. 5 is a top plan view of exemplary gripper and spacer means that may be utilized according to the present invention;

FIG. 6 is a side view taken generally along lines 6—6 of FIG. 5, showing the apparatus partly in elevation and partly in section.

DETAILED DESCRIPTION OF THE INVENTION

Figure 1:
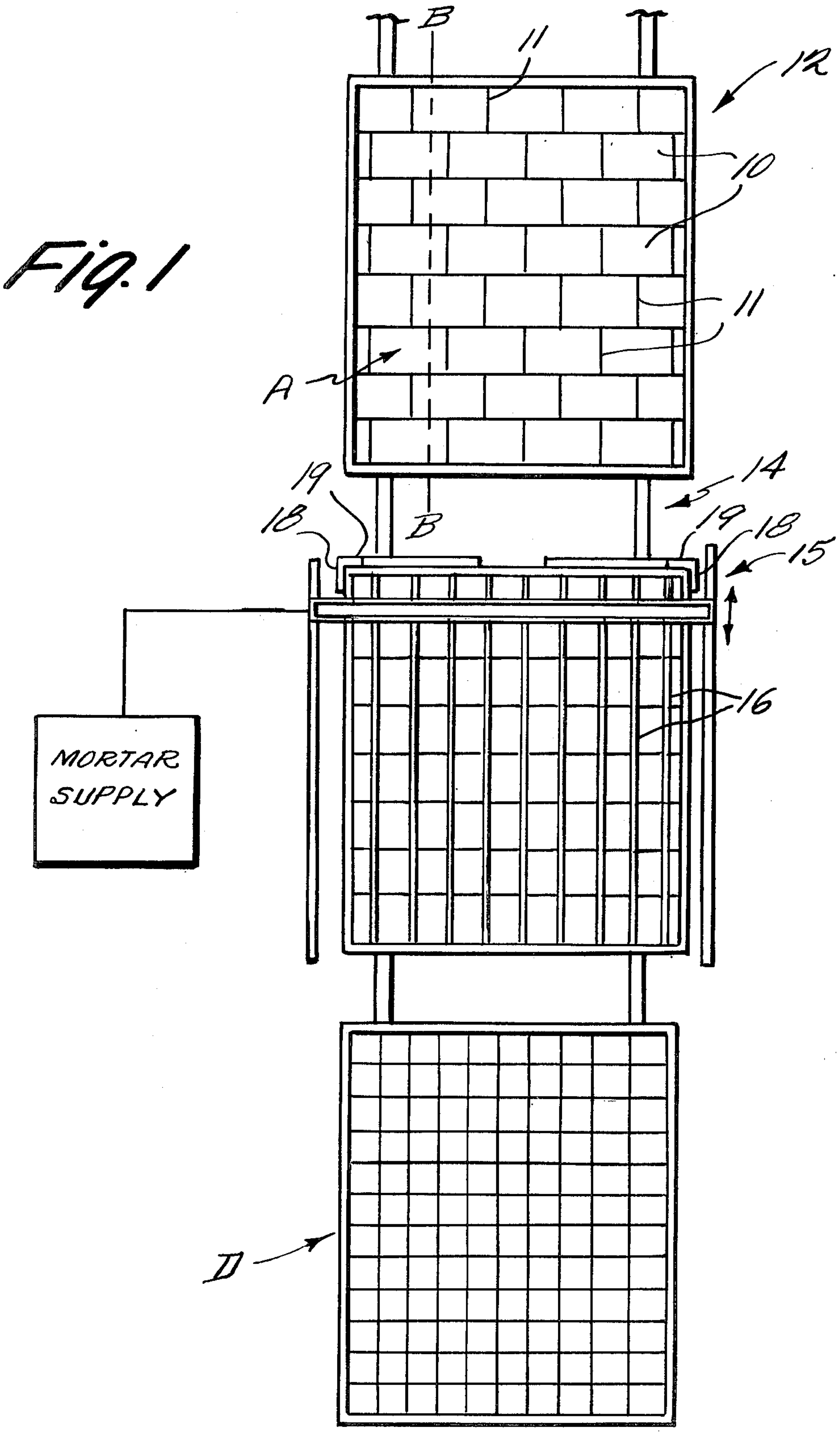
FIG. 1 is a top plan view of an exemplary wall section being produced according to the present invention showing a step-by-step completion thereof utilizing exemplary apparatus according to the present invention.

Exemplary apparatus according to the present invention for effecting the method of the present invention is shown diagrammatically in the drawings. A horizontally disposed preformed wall panel, shown generally at A in FIG. 1, composed of bricks, blocks, or the like, 10 is preferably disposed on a generally flatbed car 12 or the like, which is movable along a track 14. The preformed wall panel A is adapted to be disposed so that line B—B therethrough is disposed in a vertical plane when a wall constructed with wall panel A is in use, as for forming the wall of a building. The wall panel A is adapted to have a preformed lining panel C, composed of tile members 25 or the like, affixed thereto to thereby form a finished wall section D. When the wall section D is in use—for example as a wall of a building—the tile lining panel C will be disposed toward the interior of the building, and the brick wall panel A will be disposed exteriorly thereof.

According to the method of the present invention, the wall panel A and the lining panel C are readily and efficiently assembled. A preformed wall panel A on a car 12 is moved along track 14 until under a mortar applying device, such as shown at 15 in FIG. 1, for applying parallel spaced columns of mortar 16 on the upwardly facing surface thereof. It is preferred that the device 15 apply the mortar along lines parallel to line B—B and over and in grooves 11 between adjacent bricks 10 so that when a finished wall section is in use, the columns 16 will be disposed in a vertical plane.

A lining panel C to be affixed to a wall panel A is preferably formed as shown and with the apparatus in FIG. 2. A conveyor 20 or the like transports individual tile members 25 in the direction shown in FIG. 2 until a row of adjacent tiles is completed, then the tiles 25 are moved by conveyor 26 or the like onto a grouping table 28 or the like, and are aligned thereon with edges 30 of table 28. Each tile 25 may be of the type having a plurality of webs 24 formed on one surface thereof, however, tiles without webs are also readily utilizable. At least two webs 24 preferably are provided adjacent edges 23 of tiles 25 that have webs. Preferably, each of the tiles 25 is approximately of the same width—or half the width—as the bricks 10 onto which they are to be disposed.

After a group of tiles 25 are disposed on grouping table 28 to thereby form a lining panel C of unconnected tiles according to one embodiment of the present invention a space F is introduced in the direction E between each of the tiles 25 to thereby form a lining panel C of unconnected tiles. Preferably, the spacing of the tiles is accomplished by spreading means shown generally at 32 in FIGS. 3*a* and 3*b*. Such spreading means 32 includes a plurality of individual links 34 of equal length pivotally interconnected as points 35 and 36 thereof to form a scissors-like assembly. At each of the points 36 there is provided a pin 38 having an abutment ledge 40 formed thereon for extending upwardly through a slot 29 in grouping table 28 for engaging a web 24 of a tile 25. The pin 38 prefereably is guided in slot 29 so that movement of the interconnected levers 34 of assembly 32 results in translational movement of the tiles 25 abutted by the ledges 40 of pins 38. By operation of the assembly 32 it is thus seen that a uniform space F is introduced between each of the tiles 25.

Dividing walls 41 or the like may be provided along the length of grouping table 28 to provide for spacing of the tiles 25 in the direction perpendicular to direction E, or the tiles 25 may be disposed adjacent to each other in that dimension.

After the spaces F have been introduced between the tile members 25 of ining panel C according to one embodiment of the invention, the panel is transferred as a whole (or conveniently segmented portions thereof) to a position directly over a wall panel A having mortar columns 16 disposed on a face thereof. The lining panel C is orientated so that a place passing through spaces F between tiles 25 thereof is parallel to and directly over each of the columns 16. Apparatus for moving the lining panel C into such operative engagement preferably consists of conventional vacuum gripping means, shown generally at 45 in FIGS. 4*a* and 4*b*. The means 45 includes a plate portion 47 thereof adapted to make surface-to-surface contact with the tops of the tiles 25 of the panel C, and having a vacuum connection 48 leading to the surface thereof. A vacuum applied through connection 48 causes the tiles 25 to tightly adhere to the plate portion 47, the spaced relationships therebetween being maintained. The tiles 25 may then be lifted by applying an upward force to hooks 50 of assembly 45, as shown in FIG. 4*a*. The hooks 50 or the like are preferably rigidly attached to a lifting plate 52 which is disposed generally parallel to gripping plate portion 47 and is movable with respect thereto because of the lost-motion connection 54 therebetween, which connection preferably is formed by pins 56 having spaced surfaces 58 and 59 thereof disposed on opposite sides of plate 52. By providing such a lost-motion connection, the chances of damage being done to the vacuum connection 48 are minimized while large forces may be applied with the assembly 45.

After lining panel C is lifted by vacuum gripping assembly 45 and placed into proper position over wall panel A having columns 16 of mortar or the like disposed thereon, the panel C is lowered onto the wall panel A and the tiles 25 thereof are pressed into engagement with bricks 10 or the like and mortar columns 16 thereof by means 45 by the application of a downward force therewith (as shown in FIG. 4*b*). Ledges 18 and 19 on cars 12 guide the movement of the assembly 45 in its downward path to insure proper positioning of the tiles 25 on the panel A. In the preferred form of the invention, with the mortar columns disposed over the grooves 11 between adjacent bricks 10 or the like, the mortar 16 will hold adjacent tiles 25 together, will be forced somewhat into grooves 11, and will hold the tiles 25 to the bricks 10 of wall panel A. Also, "breathing" spaces G will be provided between the bottom surfaces of the tiles 25 and the top surfaces of bricks 10 whereby proper ventilation is provided for the bricks, allowing for the transportation of the humidity diffusing through the bricks, thereby preventing freezing or loosening thereof due to the weather. The columns 16 also have smooth outside edges which allow water to run off the bricks without getting into the joints and loosening them.

Figure 7:
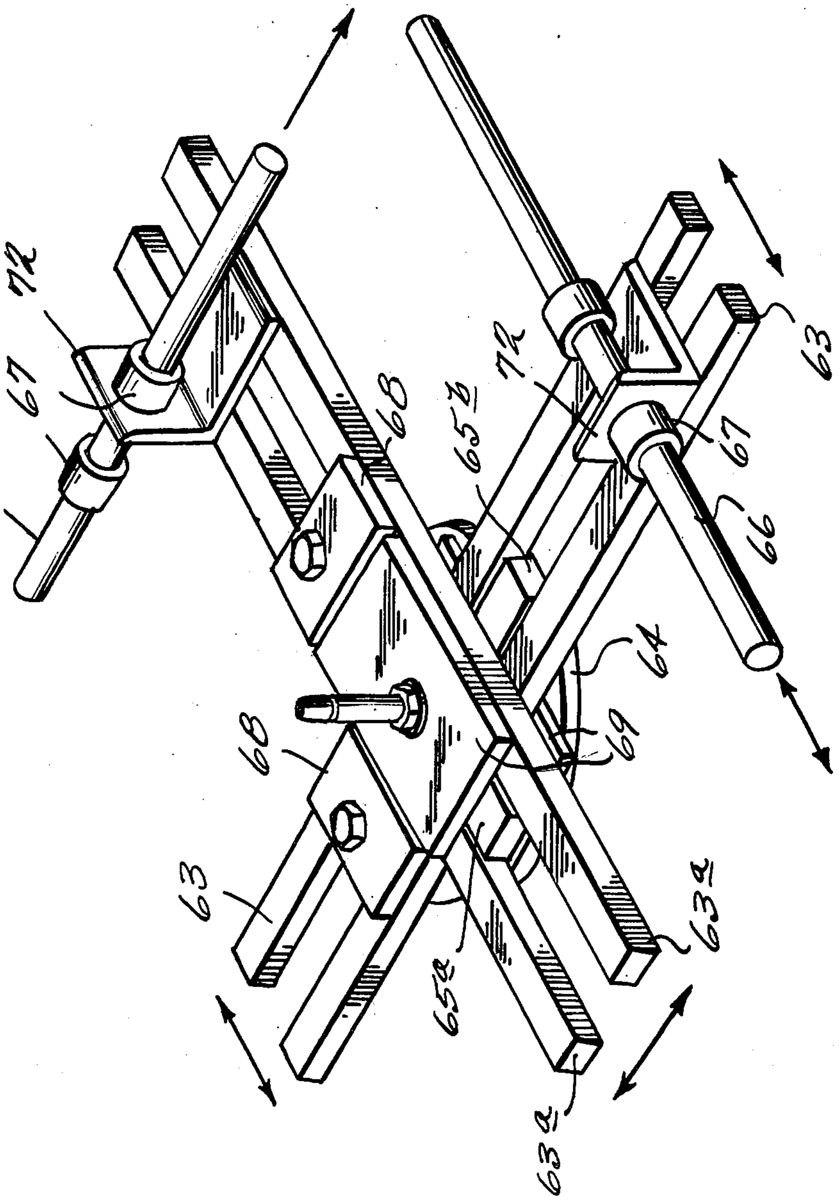
FIG. 7 is a perspective detail view of a portion of the vacuum gripper and spacing means of FIG. 5.

According to another embodiment of the present invention, the same apparatus can be utilized for lifting the individual tiles of the preformed panel C and introducing the spacings between the tiles while lifted, and before pressing them into engagement with a wall panel A. Exemplary apparatus for accomplishing this is shown in FIGS. 5–7. Such apparatus may take the form of a plurality of vacuum grippers 64 interconnected by a grid of guide rails 62, 62*a*, and 63 and movable with respect thereto. The guide rails 62 and 62*a* may be affixed to a gripper frame 61, and the guide rails 63 and 63*a* may be movably mounted on guide rails 62 and 62*a* and on each other. The guide rails 63 and 63*a* are arranged perpendicularly with respect to each other, as are the guide rails 62 and 62*a*. Connected at each intersection point of guide rails 62, 62*a*, 63 and 63*a* is a vacuum gripper 64 or the like, having guiding pieces 65*a* and 65*b* thereof for cooperation with respective guide rails, as shown most clearly in FIG. 7. The guiding pieces provide for relative movement between the grippers 64 and the respective guide rails with which they are associated.

Means for moving the respective guide rails with respect to each other for introducing spacing between tiles 25' held by grippers 64 preferably comprise one or more push rods 66 in each dimension of the grid. Each push rod is preferably powered by a hydraulic cylinder 70 or other suitable power means for effecting movement thereof. At each intersection between a rod 66 and a guide rail over which it passes are a pair of collars 67 or the like for cooperation with a plate 72 or the like operatively connected to the respective guide rod. Each pair of collars 67 have a predetermined spacing therebetween. Movement of the respective guide rails by the respective push rods 66 results in movement of each of the grippers 64 attached to a particular guide rod. Such movement is transferred to the grippers by stops 68 operatively connected to preselected guide rails, which stops 68 cooperate with clamping plates 69 or the like on grippers 64. Although all grippers 64 may have plates 69 and stops 68 associated therewith, only the grippers around the periphery of the grid may have them, as sown in FIG. 5.

The operation of the gripper-associated separating means shown in FIGS. 5–7 is apparent from an inspection of the drawings. After tiles 25' or the like (such means may be used with tiles with or without webs) are picked up by vacuum grippers 64 cylinders 70 and 70 prime are actuated, which move the respective push rods 66 connected thereto a predetermined distance H.

Because of the relative spacing between the collars 67 of rods 66, and the predetermined spacings of the stops 68, each of the grippers 64 within a row or column is moved a predetermined distance with respect to the grippers in the other rows and columns and the plate 61 to effect spacing of the tiles 25 prime. For instance, the grippers 64 in the row closest to cylinder 70 are moved a distance H1, while grippers in the next row are moved a distance H2 H1, the grippers in the fourth row are moved only slightly or not at all. The same is true with respect to the grippers in the columns. Of course, the distances H, H1, H2, etc. can be set to any value by adjustment of the collars 67 and stops 68 (the collar spacing is inversly proportional to the stop spacing), and the distance H can be varied between the columns and rows so that greater or lesser spacing is introduced along each of the directions J and K.

The method of producing a finished wall section according to the present invention includes the following steps: A wall panel A formed of bricks, blocks, or the like is disposed in a generally horizontal plane. The panel A is adapted to be disposed vertically when serving as a finished wall section. A plurality of tiles 25 or the like, having webs 24 formed on a surface thereof, are arranged in a generally horizontal plane so that the webs 24 are on the bottom of the tiles 25, to thereby form an unconnected lining panel C. Uniform spaces F are introduced—as in direction E—between the individual tiles 25 or 25 prime. When the spreading means 32 is utilized, the spacing is introduced before the individual tiles of the preformed panels are lifting from the table 28 by vacuum grippers 45 or the like, while when the vacuum grippers 64 are utilized the predetermined spacings are introduced after the tiles are lifted from the table 28. The lining panel C is then in condition to be transferred directly over to a wall panel A, for application thereto.

A wall panel A has a plurality of evenly-spaced columns 16 of mortar or the like applied over the upwardly facing surface thereof, as with means 15. Preferably, the columns 16 are arranged so that when the finished wall section of which panel A will be a part is in use, the columns 16 will be vertical. Also, the columns 16 are preferably applied over the grooves 11 between the bricks 10 making up the wall panel A.

After columns 16 are arranged on panel A, and lining panel C is assembled and the tiles therein properly spaced, and are transferred in groups or en masse to a position just above the panel A, they are ready to be attached to panel A. The panel C may be arranged so that the spaces F between the tiles 25 are parallel to and just above mortar columns 16 (the webs 24, if any, being adjacent the spaces F). Then with the help of guide ledges 18 and 19 on car 12 or the like on which the panel A is disposed, the lining panel C is brought into engagement with the panel A, and is pressed down thereon by means 45 or 64, resulting in the tiles 25 or 25 prime being secured to the bricks 10 of panel A by the mortar 16.

It will thus be seen that according to the teachings of the present invention a method of producing high-quality preformed finished wall sections that is quick and efficient is disclosed, and that simple and efficient apparatus for accomplishing said method is depicted. The method may be used with tiles with or without webs. While the invention has been herein shown and described in what is presently conceived to be the most practical and preferred embodiment, it will be apparent to one of ordinary skill in the art that many modifications may be made thereof within the scope of the invention. For instance, other mortar applying means, gripping means, and spacing means could be utilized, or the mortar columns could be orientated in a different manner. Also, other materials could be used. Other modifications are also possible. Thus it is intended that the present invention be limited only by the scope of the appended claims.

What is claimed is:

1. A method of producing a preformed finished wall section comprising the steps of:

(a) disposing a preformed wall panel of bricks, blocks, or the like, in a generally horizontal plane, said panel being adapted to be disposed vertically when a finished wall section of which the panel is a part is in use, (b) arranging in a generally horizontal plane a plurality of individual tile members or the like in substantially abutting engagement with each other to form an unconnected lining panel, (c) applying a plurality of columns of mortar on the upper surface of said wall panel, said columns being arranged in generally parallel relationship, (d) automatically introducing spaces of predetermined uniform dimension between said tile members by moving said tile members out of substantially abutting engagement with each other for proper disposition thereof in relationship with said wall panel, (e) transferring said unconnected lining panel members in groups into operative position above said wall panel, and (f) pressing said lining panel tile members in groups onto said wall panel, said individual members being connected to each other and said wall panel by said columns of mortar, thereby forming a preformed finished wall section.

2. A method as recited in claim 1 wherein said columns of mortar are disposed in parallel planes which will be vertically arranged when said wall section is finished and in use.

3. A method as recited in claim 2 wherein said columns of mortar are applied over and in grooves between adjacent bricks or the like of said wall panel, which grooves will be disposed in vertical planes when said finished wall section is in use.

4. A method as recited in claim 1 wherein said plurality columns of mortar are all applied simultaneously on said wall panel surface.

5. A method as recited in claim 1 wherein said step of transferring said lining panel members into operative position above said wall panel is accomplished by vacuum gripping means, at least one vacuum gripper being associated with each tile member.

6. A method as recited in claim 1 wherein proper spaces are automatically introduced between all said individual tile members of said lining panel simultaneously.

7. A method as recited in claim 1 wherein said plurality columns of mortar are applied over grooves between adjacent bricks, blocks or the like forming said wall panel.

8. A method as recited in claim 1 wherein said step of automatically introducing spaces of predetermined uniform dimension between said tile members is accomplished during transfer into operative position above said wall panel.

9. A method as recited in claim 8 wherein said steps of automatically introducing spacing and transferring of said lining panel members is accomplished by vacuum gripper means and spacing means associated therewith.

10. A method as recited in claim 1 wherein each of said tile members has a plurality of spaced webs formed thereon on a surface thereof adapted to be brought into engagement with said wall panel, each of said individual tile members when disposed in said horizontal plane having said surface with webs formed thereon being the bottom surface thereof so that an air space between each tile and the wall panel is provided, wherein during said step of applying columns of mortar on the upper surface of said wall panel care is taken to insure that the columns are spaced a distance generally corresponding to the distance between said webs of said tile members, and said method comprising the further step of aligning said transported unconnected lining tile members in groups so that the webs thereof will be aligned with said columns of mortar on said wall panel upper surface before pressing of said tile members onto said wall panel.

* * * * *